(12) United States Patent
Hosotani et al.

(10) Patent No.: US 7,821,239 B2
(45) Date of Patent: Oct. 26, 2010

(54) SWITCHING POWER SUPPLY (75) Inventors: Tatsuya Hosotani, Muko (JP); Hiroshi Takemura, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 1280 days.

(21) Appl. No.: 10/541,374

(22) PCT Filed: Nov. 8, 2004

(86) PCT No.: PCT/JP2004/016529

§ 371 (c)(1),
(2), (4) Date: Jul. 1, 2005

(87) PCT Pub. No.: WO2005/076447

PCT Pub. Date: Aug. 18, 2005

(65) Prior Publication Data

US 2006/0181230 A1    Aug. 17, 2006

(30) Foreign Application Priority Data

Feb. 3, 2004    (JP) ............................. 2004-027036

(51) Int. Cl.
*G05F 1/577* (2006.01)
*H02M 3/335* (2006.01)

(52) U.S. Cl. .................... 323/267; 323/271; 363/21.03; 363/21.12

(58) Field of Classification Search ............... 363/21.01, 363/21.04, 21.06, 21.09, 21.1, 21.11, 21.12, 363/21.14, 21.17, 21.18, 97, 127, 131, 21.02, 363/21.03; 323/267, 271
See application file for complete search history.

(56) References Cited

U.S. PATENT DOCUMENTS 4,034,232 A * 7/1977 LaVenture ................... 307/32

(Continued)

FOREIGN PATENT DOCUMENTS

CN    1347190 A    5/2002

(Continued)

OTHER PUBLICATIONS

Electrical Engineering Handbook (Sixth Edition) by the Institute of Electrical Engineers of Japan, Feb. 20, 2001, vol. 20, Chapter 9, Section 2 Switching Regulator, pp. 851-852.

(Continued)

*Primary Examiner*—Gary L Laxton
(74) *Attorney, Agent, or Firm*—Keating & Bennett, LLP (57) ABSTRACT

A switching power-supply unit uses a time when a transformer voltage Vt inverts due to a rectifier diode (Ds1) entering a non-conducting state as a trigger, and a first switching control circuit (CNT1) turns on a first switching element (Q1) after a predetermined delay time passes. A second switching control circuit (CNT2) turns on a second switching element (Q2) using a time when the transformer voltage Vt inverts due to turning off of the first switching element (Q1) as a trigger. A third switching control circuit (CNT3) turns on a third switching element (Q3) using turning off of the second switching element (Q2) as a trigger. The first switching control circuit (CNT1) determines a period ton1 of the first switching element (Q1) such that a first output voltage Vo1 is set to a predetermined value. The second switching control circuit (CNT2) determines an ON-period ton2 of the second switching element (Q2) such that a second output voltage Vo2 is set to a predetermined value. The third switching control circuit (CNT3) determines an ON-period ton3 of the third switching element (Q3) such that a third output voltage Vo3 is set to a predetermined value.

10 Claims, 5 Drawing Sheets

U.S. PATENT DOCUMENTS

| | | | | |
|---|---|---|---|---|
| 5,570,278 A * | 10/1996 | Cross | ............................ | 363/20 |
| 6,061,252 A * | 5/2000 | Hosotani | ...................... | 363/16 |
| 6,265,855 B1 * | 7/2001 | Aas et al. | ..................... | 323/272 |
| 6,469,913 B2 | 10/2002 | Hosotani et al. | | |
| 7,518,263 B2 * | 4/2009 | Gan et al. | ...................... | 307/32 |
| 2002/0101742 A1 | 8/2002 | Hosotani et al. | | |

FOREIGN PATENT DOCUMENTS

| | | | |
|---|---|---|---|
| JP | 02-262825 A | 10/1990 | |
| JP | 07-083545 B2 | 3/1995 | |
| JP | 09-285120 | 10/1997 | |
| JP | 2002-262570 A | 9/2002 | |
| JP | 2003-504997 | 2/2003 | |
| JP | 2004-023987 | 1/2004 | |
| WO | WO 01/03277 A2 | 1/2001 | |

OTHER PUBLICATIONS

Official communication issued in the counterpart Chinese Application No. 200480002604.4, mailed on Jul. 6, 2007.

Official Communication issued in corresponding Chinese Patent Application No. 200480002604.4, mailed on Jul. 24, 2009.

Official communication issued in counterpart Chinese Patent Application No. 200480026044, mailed on Feb. 5, 2010.

* cited by examiner

SWITCHING POWER SUPPLY

BACKGROUND OF THE INVENTION

1. Field of the Invention

The present invention relates to methods for controlling a switching power supply including a plurality of switching elements and, more particularly, to control methods that do not require an oscillation circuit.

2. Description of the Related Art

Control procedures called PWM (Pulse Wide Modulation) systems and PFM (Pulse Frequency Modulation) systems are generally available as methods for controlling switching elements in switching power supplies (See Non-Patent Document 1).

PWM systems are systems for controlling the ratio of an ON-period of a switching element to a switching period, and generally, the switching period is constant. In a case where a plurality of switching elements is provided, the ON-period ratios of the switching elements are equal to each other or inverted with respect to each other.

PFM systems are systems for controlling a switching frequency, and generally, an ON-period ratio of a switching element is constant. In a case where a plurality of switching elements is provided, the relationships between the ON-period ratios and the switching frequencies of the switching elements are equal to each other. Non-Patent Document 1: Electrical Engineering Handbook (Sixth Edition) by The Institute of Electrical Engineers of Japan, Feb. 20, 2001, Vol. 20, Chapter 9, Section 2 Switching Regulator, pp 851-852.

In known technologies, when a plurality of switching elements is provided, an oscillation circuit is also provided. A plurality of driving signals is produced based on an oscillation signal of the oscillation circuit, and the driving signals are transmitted to control terminals of the switching elements. Thus, if a delay time or an advanced time is generated in a path for transmitting the driving signals or a driving circuit, a phenomenon in which the plurality of switching elements is in an ON-state at the same time occurs even though the plurality of switching elements connected in series with each other must be driven in order. This phenomenon may not only prevent normal operation but may also destroy a power-supply unit due to an overcurrent or the like, thus significantly reducing reliability.

Thus, in order to avoid the phenomenon of the plurality of switching elements being in the ON-state at the same time, a dead time in which the plurality of switching elements is in an OFF-state at the same time is provided. However, since the dead time does not contribute to voltage conversion, providing a dead time having an unnecessary long duration is one factor that reduces the power conversion efficiency. In addition, since the ON-period ratio and the switching frequency change in PWM systems and PFM systems, respectively, it is very difficult to set the dead time properly, and a complicated configuration is required.

In addition, in known technologies, obviously, an oscillation circuit functioning as a standard is required.

Furthermore, in known technologies, a control process to stabilize an output voltage by changing an ON-period of a switching element functioning as a standard is performed. For example, keeping an output voltage constant is only one condition for the control.

SUMMARY OF THE INVENTION

In order to overcome the problems described above, preferred embodiments of the present invention solve the problems caused by a plurality of switching elements being in an ON-state at the same time, are capable of setting a plurality of conditions for control to satisfy predetermined conditions, and provide a switching power-supply unit that does not require an oscillation circuit functioning as a standard.

A switching power-supply unit according to a preferred embodiment of the present invention includes an inductor or a transformer and a plurality of switching elements switching a current flowing in the inductor or the transformer and converting power by turning on and off the switching elements, and including a switching control circuit that turns on the next switching element in accordance with a change of a voltage or a current generated by turning off of a switching element in an ON-state, that sequentially turns on and off the switching elements in association with each other, that repeats a series of on-off operations of the switching elements periodically, that determines an ON-period of each of the switching elements in accordance with a condition independently provided for each of the switching elements, and that controls the ON-period of each of the switching elements.

A dead time in which two consecutive switching elements from among the plurality of switching elements are turned off is preferably provided between ON-periods of the two switching elements and the dead time is preferably arranged in accordance with a delay time from turning off of the switching element in the ON-state and turning on of the next switching element.

The dead time is preferably set such that the switching element is turned on when a voltage across the switching element becomes zero or is reduced to near zero.

The next switching element is turned on preferably using a voltage at the inductor or the transformer generated due to turning off of the switching element in the ON-state from among the plurality of switching elements.

The switching control circuit preferably detects an output voltage to a load to determine the ON-period in accordance with the output voltage.

The switching control circuit preferably detects a change or a polarity of a voltage generated at the inductor or the transformer to determine the ON-period.

The switching control circuit preferably detects the current flowing in the inductor or the transformer to determine the ON-period.

The switching control circuit preferably detects a voltage across the switching element to determine the ON-period.

The switching control circuit preferably detects a current flowing in the switching element to determine the ON-period.

The switching control circuit preferably determines the ON-period of the switching element such that the switching element is turned off when the current flowing in the switching element becomes zero or reaches near zero.

According to preferred embodiments of the present invention, since turning off of a switching element in an ON-sate causes the next switching element to be turned on, the inconvenience of two switching elements being in an ON-state at the same time basically does not occur, thus improving the reliability of a switching power-supply unit.

In addition, in known technologies, control to stabilize an output by changing an ON-period of a switching element functioning as a standard is performed, and only one condition is provided for controlling the output voltage. In preferred embodiments of the present invention, however, two or more conditions, that is, at most, conditions whose number corresponds to the number of switching elements, can be established.

In addition, the switching frequency is determined in accordance with the accumulation of ON-pulses of a switching element, and an ON-period of each switching element is set. Thus, an oscillation circuit is not required.

According to preferred embodiments of the present invention, a dead time based on a delay time of turning on and off of switching elements is arranged between ON-periods of two consecutive switching elements from among the plurality of switching elements, and the reliability of the switching power-supply unit due to the plurality of switching elements turning on at the same time is improved. In addition, since the dead time is set in accordance with the delay time before turning on, the dead time can be properly set easily and the dead time is not unnecessarily increased or decreased even if the switching frequency and the ON-period ratio changes due to a change in the ON-period of each switching element. Thus, the power conversion efficiency can be kept high.

According to preferred embodiments of the present invention, since the switching element is turned on when the voltage across the switching element becomes zero or is reduced to near zero, the switching loss can be significantly reduced and high efficiency can be achieved due to a zero-voltage switching operation of turning on at zero voltage.

According to preferred embodiments of the present invention, since the switching control circuit turning on the next switching element using the voltage at the inductor or the transformer generated due to turning off of a switching element in an ON-state from among the plurality of switching elements is provided, a voltage signal generated at the inductor or the transformer can be easily captured as a trigger signal and the switching element can be used as a driving voltage. Thus, a simple circuit structure can be achieved.

According to preferred embodiments of the present invention, since an output voltage to a load is detected to determine the ON-period in accordance with the voltage, a constant-voltage power-supply unit can be easily configured.

According to preferred embodiments of the present invention, since a change (falling and rising) or the polarity of the voltage generated at the transformer is detected to determine the ON-period of the switching element, a voltage signal generated at the transformer can be easily used as a trigger signal. Thus, a simple circuit structure can be achieved.

According to preferred embodiments of the present invention, since the current flowing in the transformer is detected to determine the ON-period, for example, a conduction period of a rectifier diode and the ON-period of the switching element can be set equal to each other. Thus, an effective current and the peak value of a current flowing in the rectifier diode and the transformer can be reduced, and the conduction loss is thus reduced.

According to preferred embodiments of the present invention, since the voltage across the switching element is detected to determine the ON-period, the ON-state and the OFF-state of the switching element can be accurately determined, and this can be easily used as a trigger signal.

According to preferred embodiments of the present invention, since the switching control circuit detects the current flowing in the switching element to determine the ON-period, the state of the switching element can be accurately determined and the switching element can be controlled. Thus, a necessary and appropriate dead time can be provided.

According to preferred embodiments of the present invention, since the switching control circuit turns off the switching element when the current flowing in the switching element becomes zero or reaches near zero, the switching loss can be significantly reduced due to a zero-current switching operation of turning on at zero current. Thus, high efficiency can be achieved.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 1 includes a circuit diagram and a waveform chart of a switching power-supply unit according to a first preferred embodiment of the present invention.

FIG. 2 includes a circuit diagram and a waveform chart of a switching power-supply unit according to a second preferred embodiment of the present invention.

FIG. 3 includes a circuit diagram and a waveform chart of a switching power-supply unit according to a third preferred embodiment of the present invention.

FIG. 4 includes a circuit diagram and a waveform chart of a switching power-supply unit according to a fourth preferred embodiment of the present invention.

FIG. 5 includes a circuit diagram and a waveform chart of a switching power-supply unit according to a fifth preferred embodiment of the present invention.

DETAILED DESCRIPTION OF PREFERRED EMBODIMENTS

A switching power-supply unit according to a first preferred embodiment will be described with reference to FIG. 1. Part (A) of FIG. 1 is a circuit diagram of the switching power-supply unit, and part (B) is an illustration showing the relationship between the waveform of each section of the switching power-supply unit and time.

Figure 1A:
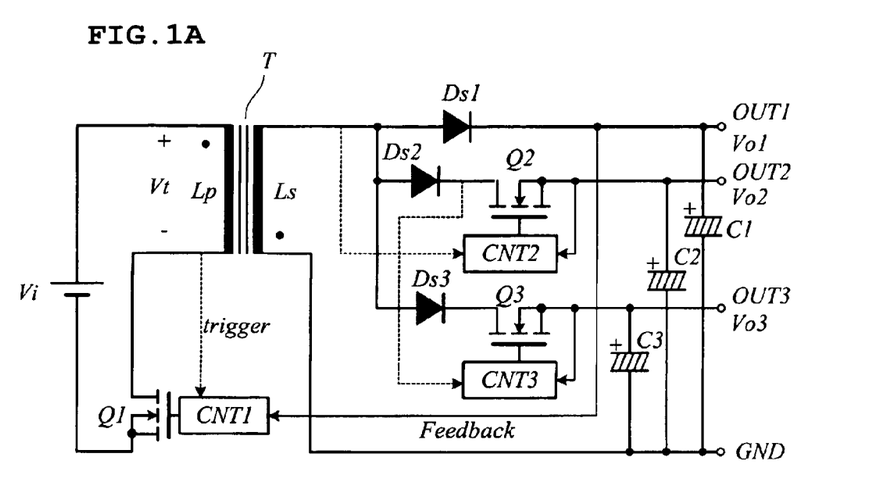
Figure 1B:
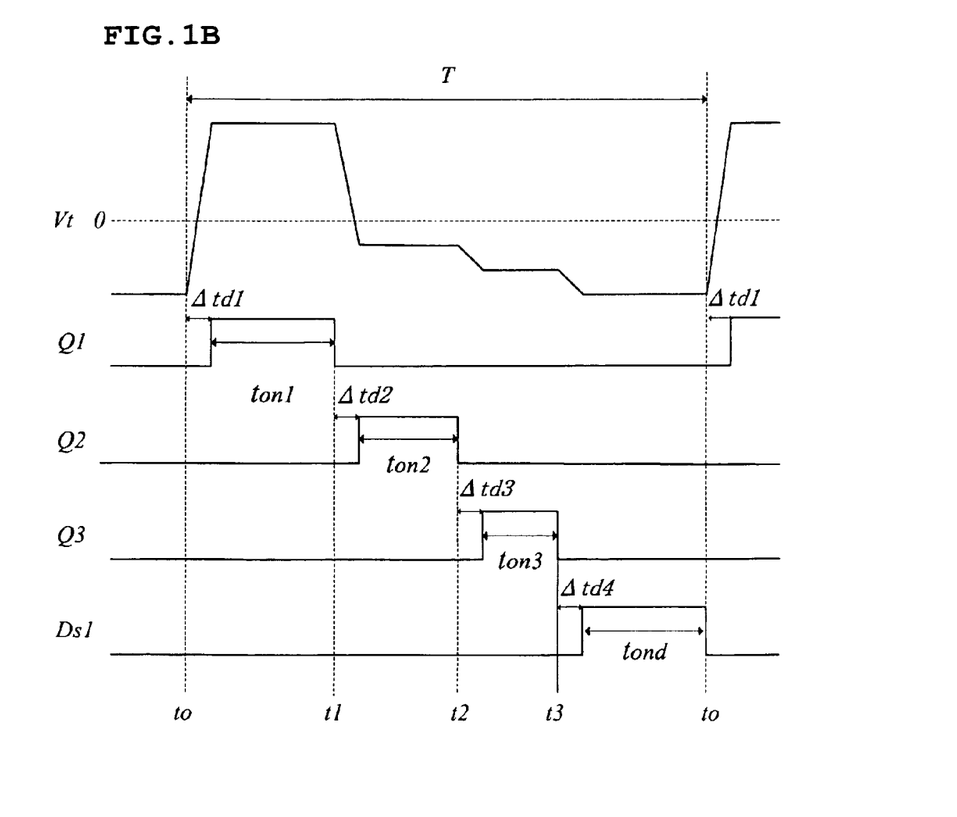

In part (A) of FIG. 1, Vi denotes an input power supply, and T denotes a transformer. A first switching element Q1 is connected to a primary winding Lp of the transformer T. For a secondary winding Ls of the transformer T, a first rectification and smoothing circuit constituted by a rectifier diode Ds1 and a smoothing capacitor C1 is provided. Also, a second rectification and smoothing circuit constituted by a rectifier diode Ds2, a second switching element Q2, and a second smoothing capacitor C2 is provided. In addition, a third rectification and smoothing circuit constituted by a rectifier diode Ds3, a third switching element Q3, and a third smoothing capacitor C3 is provided.

A first switching control circuit CNT1 on/off-controls the first switching element Q1, a second switching control circuit CNT2 on/off-controls the second switching element Q2, and a third switching control circuit CNT3 on/off-controls the third switching element Q3. In the figure, a broken line entering each of the switching control circuits CNT1, CNT2, and CNT3 schematically indicates a trigger path, and a solid line entering each of the switching control circuits CNT1, CNT2, and CNT3 schematically indicates a feedback path.

The first switching control circuit CNT1 receives a voltage (transformer voltage Vt) of the transformer T as a trigger, and turns on Q1 at a time when the drain voltage of Q1 falls. The first switching control circuit CNT1 also detects an output voltage Vo1 of a first output terminal OUT1, and determines an ON-period of the first switching element Q1 such that Vo1 is set to a predetermined voltage. In other words, the first switching control circuit CNT1 turns off Q1 at a time when the required ON-period of Q1 has passed.

The second switching control circuit CNT2 receives the voltage (transformer voltage) Vt of the transformer T as a trigger, and turns on the second switching element Q2 at a time when the voltage (transformer voltage Vt) of the transformer T inverts. Then, the second switching control circuit CNT2 detects a voltage Vo2 of a second output terminal OUT2, and determines an ON-period of the second switching element Q2 such that Vo2 is set to a predetermined voltage. In other words, the second switching control circuit CNT2 turns off Q2 at a time when the required ON-period of Q2 has passed.

The third switching control circuit CNT3 receives a drain voltage of the second switching element Q2 as a trigger, and turns on Q3 at a time when the drain voltage of Q2 rises. Then, the third switching control circuit CNT3 detects a voltage Vo3 of a third output terminal OUT 3, and determines an ON-period of the third switching element Q3 such that Vo3 is set to a predetermined voltage. In other words, the third switching control circuit CNT3 turns off Q3 at a time when the required ON-period of Q3 has passed.

In part (B) of FIG. 1, Vt represents the voltage (transformer voltage) of the transformer T, and Q1, Q2, Q3, and Ds represent the states of the first to third switching elements Q1 to Q3 and the first rectifier diode Ds1, respectively. Here, a high level represents an ON-state, and a low level represents an OFF-state.

(1) State 1 [t0-t1]

First, when the voltage (transformer voltage Vt) of the transformer T inverts at time t0, after the passage of a delay time $\Delta td1$ from the time t0, the gate voltage of the first switching element Q1 is turned to the high-level by the first switching control circuit CNT1, and Q1 is thus turned on. The delay time $\Delta td1$ is set in accordance with a resonance period determined based on the primary inductance of the transformer T, the parasitic capacitance between the drain and source of Q1, and the like, such that Q1 is turned on at a time when the voltage between the drain and source of Q1 becomes zero. Thus, a zero-voltage switching operation of Q1 is performed, and the switching loss is significantly reduced.

Then, the first switching control circuit CNT1 determines an ON-period ton1 of Q1 such that the voltage of the voltage Vo1 of the first output terminal OUT1 is set to a predetermined value. In other words, at time t1, that is, after the passage of $\Delta td1+ton1$ from time t0, the first switching control circuit CNT1 turns the gate voltage of Q1 to the low-level. Thus, Q1 is turned off. The exciting energy of the transformer T is determined in accordance with the ON-period ton1 of Q1. As a result, the voltage of Vo1 is determined.

(2) State 2 [t1-t2]

When Q1 is turned off, the transformer voltage Vt inverts. The second switching control circuit CNT2 receives the voltage of the secondary winding Ls of the transformer T as a trigger signal, and turns the gate voltage of the second switching element Q2 to the high-level at time t1 when the transformer voltage Vt inverts. Thus, Q2 is turned on after the passage of a delay time $\Delta td2$ from time t1. The delay time $\Delta td2$ is set in accordance with a resonance period determined based on the secondary inductance of the transformer T, the parasitic capacitance between the drain and source of Q2, and the like, such that Q2 is turned on at a time when the voltage between the drain and source of Q2 becomes zero. Thus, a zero-voltage switching operation of Q2 is performed.

The second switching control circuit CNT 2 determines an ON-period ton2 of Q2 such that the voltage of the voltage Vo2 of the second output terminal OUT2 is set to a predetermined value. In other words, at time t2, that is, after the passage of $\Delta td2+ton2$ from time t1, the second switching control circuit CNT2 turns the gate voltage of Q2 to the low-level.

(3) State 3 [t2-t3]

Since the third switching control circuit CNT3 receives the drain voltage of Q2 as a trigger signal, when Q2 is turned off at t2, the third switching element Q3 is turned on after the passage of a delay time $\Delta td3$ from t2. The delay time $\Delta td3$ is set in accordance with a resonance period determined based on the secondary inductance of the transformer T, the parasitic capacitance between the drain and source of Q3, and the like, such that Q3 is turned on at a time when the voltage between the drain and source of Q3 becomes zero. Thus, a zero-voltage switching operation of Q3 is performed.

The third switching control circuit CNT3 determines an ON-period ton3 of Q3 such that the voltage of the voltage Vo3 of the third output terminal OUT3 is set to a predetermined value. In other words, at time t3, that is, after the passage of $\Delta td3+ton3$ from time t2, the third switching control circuit CNT 3 turns the gate voltage of Q2 to the low-level.

(4) State 4 [t3-t0]

When Q3 is turned off, after the passage of a delay time $\Delta td4$ from the time when Q3 is turned off, the first rectifier diode Ds1 is turned on. This is because Ds1 is turned on due to application of a forward voltage to Ds1 when both Q2 and Q3 are in the OFF-state with the relationship Vo1>Vo3>Vo2.

Then, the first switching control circuit CNT1 determines an ON-period tond of the rectifier diode Ds1 such that the voltage of the voltage Vo1 of the first output terminal OUT1 is set to a predetermined value. When the current of Ds1 becomes zero and an inverse current is applied, the voltage of the transformer inverts at time t0. In other words, Ds1 is turned off at a time after the passage of $\Delta td4+tond$ from time t3, and the first switching control circuit CNT1 turns the gate voltage of the first switching element Q1 to the high-level after the passage of the delay time $\Delta td1$ from time t0. Time T0 here is equal to the initial time t0.

As described above, by repeating a cycle T represented in part (B) of FIG. 1 as one cycle, predetermined voltages Vo1, Vo2, and Vo3 can be obtained at the first to third output terminals OUT1 to OUT3, respectively.

With this structure, the next switching element is turned off in association with one switching element in an ON-state being turned off. Thus, in other words, an on/off state of each switching element changes in the order of the lapse of time based on causality. Since a delay time is inevitably required between turning off of one switching element in an ON-state and turning on of the next switching element, this delay time constitutes a dead time. Thus, the inconvenience of two switching elements being in the ON-state at the same time basically does not occur, thus improving the reliability of a switching power-supply unit. Furthermore, properly setting the dead time enables a zero-voltage switching operation and the like, and power conversion efficiency can be kept high without providing an unnecessarily long dead time.

In addition, since the accumulation of ON-pulses of a switching element functions as a switching frequency, an oscillation circuit is not required. Furthermore, voltages of a plurality of outputs (three outputs in the first embodiment) whose number is equal to the number of switching elements can be stabilized independently. Although setting voltages of a plurality of output terminals to respective predetermined values is provided as conditions in this example, a current or the like, instead of a voltage, may be controlled as long as it can be controlled by an ON-period of a switching element. In other words, independent conditions whose number corresponds to the number of switching elements can be met.

Although turning off of the first and second switching elements Q1 and Q2 is detected based on the drain voltages of Q2 and Q3 in the example described above, turning off of the switching elements may be detected by detecting currents flowing in the switching elements. In addition, although the transformer voltage is detected based on the voltage of the secondary winding Ls of the transformer T as a trigger of Q2 in the example described above, a change in the transformer voltage may be detected based on the voltage of the primary winding Lp. Furthermore, instead of detecting falling of the transformer voltage, a change in the polarity of the transformer voltage may be detected.

In addition, although an operation of setting an output voltage to a predetermined value in the steady state is described in the example described above, for example, by setting the maximum ON-period of each switching element at a transition time until an output voltage reaches a predetermined value, such as a starting time, a series of switching operations are repeated periodically, and a steady state is reached.

A switching power-supply unit according to a second preferred embodiment will be described with reference to FIG. 2. Part (A) of FIG. 2 is a circuit diagram of the switching power-supply unit, and part (B) is an illustration showing the relationship between the waveform of each section of the switching power-supply unit and time.

Figure 2A:
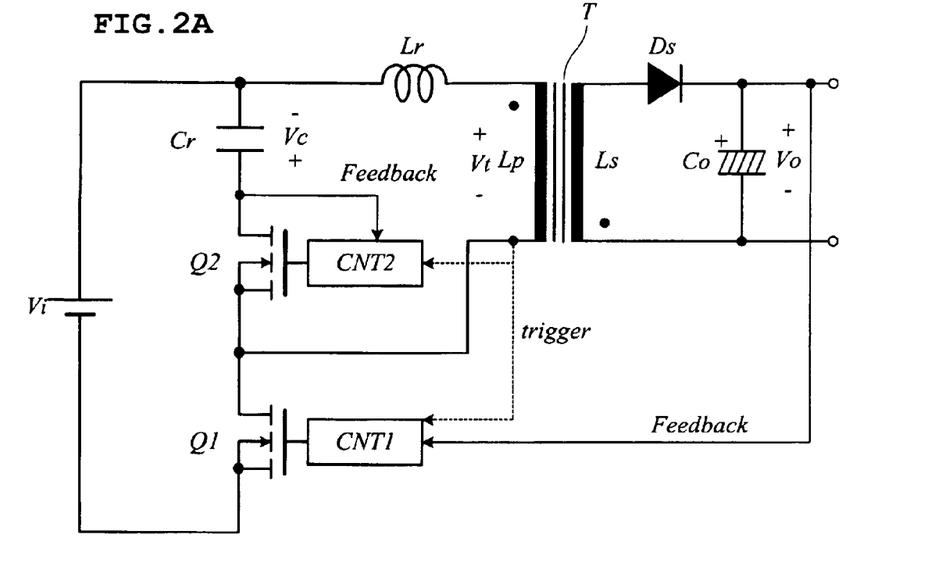
Figure 2B:
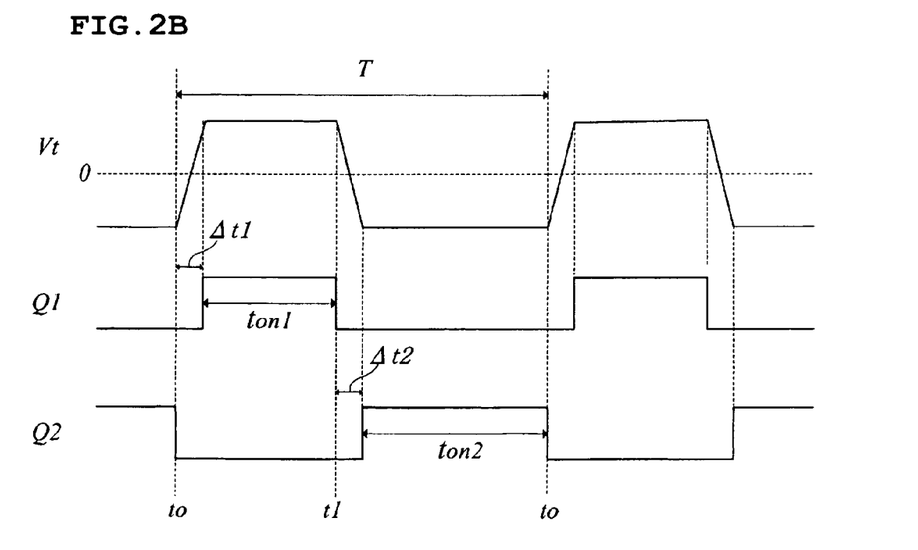

In part (A) of FIG. 2, an inductor Lr is connected to the primary winding Lp of the transformer T. The second switching element Q2 and a capacitor Cr are arranged so as to define a closed loop together with the inductor Lr and the primary winding Lp. A rectification and smoothing circuit constituted by a rectifier diode Ds and a smoothing capacitor Co is connected to the secondary winding Ls of the transformer T.

The first switching control circuit CNT1 on/off-controls the first switching element Q1, and the second switching control circuit CNT2 on/off-controls the second switching element Q2. In the figure, a broken line entering each of the switching control circuits CNT1 and CNT2 schematically indicates a trigger path, and a solid line entering each of the switching control circuits CNT1 and CNT2 schematically indicates a feedback path.

The first switching control circuit CNT1 receives an inverting time when the voltage (transformer voltage) of the transformer T rises as a trigger. The first switching control circuit CNT1 also detects an output voltage Vo, and controls the ON-period of the first switching element Q1 such that Vo is set to a predetermined voltage.

The second switching control circuit CNT2 receives an inverting time when the transformer voltage of the transformer T falls as a trigger. The second switching control circuit CNT2 also detects a voltage vc across the capacitor Cr, and controls the ON-period of Q2 such that vc is set to a predetermined voltage or vc does not exceed the predetermined voltage.

In part (B) of FIG. 2, Vt represents the waveform of the transformer voltage, and Q1 and Q2 represent the states of the first and second switching elements Q1 and Q2, respectively. Here, a high-level represents an ON-state, and a low-level represents an OFF-state.

(1) State 1 [t0-t1]

The first switching control circuit CNT1 receives a trigger signal at time t0, and after the passage of a predetermined delay time Δt1, the first switching control circuit CNT1 turns the gate voltage of Q1 to the high-level. Thus, Q1 is turned on. Since the output voltage Vo changes in accordance with the ON-period ton1 of the first switching element Q1, ton1 is determined such that a predetermined output voltage Vo can be obtained. In other words, at a time after the passage of Δt1+ton1 from time t0, the gate voltage of the first switching element Q1 is turned to the low-level, and Q1 is thus turned off.

(2) State 2 [t1-t0]

When Q1 is turned off, the transformer voltage Vt inverts. After the passage of a delay time Δt2, the second switching control circuit CNT2 turns the gate voltage of Q2 to the high-level using the inverting time of the transformer voltage Vt as a trigger. Thus, the second switching element Q2 is turned on.

Since the voltage vc across the capacitor Cr changes in accordance with the ON-period ton2 of Q2, ton2 is determined such that vc is set to a predetermined voltage. In other words, at a time after the passage of Δt2+ton2 from time t1, the second switching control circuit CNT2 turns the gate voltage of Q2 to the low-level. Thus, Q2 is turned off.

Since the transformer voltage Vt re-inverts when Q2 is turned off, after the passage of the delay time Δt1 from time t0, the first switching control circuit CNT1 turns the gate voltage of the first switching element Q1 to the high-level using the re-inversion of the transformer voltage Vt as a trigger. Time t0 here is equal to the initial time t0.

As described above, by repeating a cycle T shown in part (B) of FIG. 2 as one cycle, operation as a voltage-clamped flyback converter can be achieved. In this example, it is controlled such that the output voltage Vo to a load is kept constant and that the voltage vc across the capacitor Cr is set to a stabilized voltage. In addition, properly setting the delay times Δt1 and Δt2 enables zero-voltage switching operations of Q1 and Q2, thus significantly reducing the switching loss.

Although operation as a constant-voltage power-supply unit is described in the example described above, since Vo and vc are detected to determine the ON-periods ton1 and ton2 of the switching elements Q1 and Q2, respectively, the voltages Vo and vc can be controlled to satisfy predetermined conditions by controlling ton1 and ton2, respectively.

The first and second switching control circuits CNT1 and CNT2 may detect a voltage at the inductor Lr generated in accordance with turning off of Q1 and Q2.

Figure 3A:
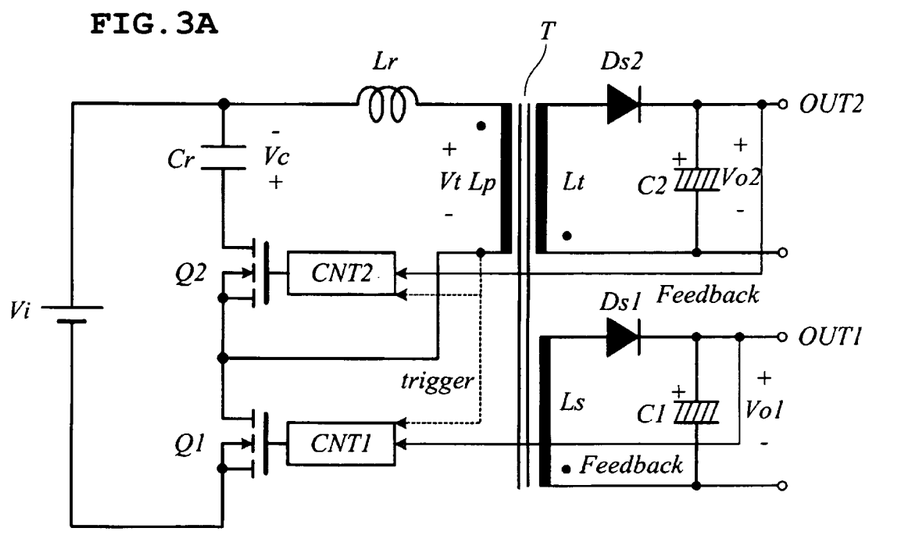
Figure 3B:
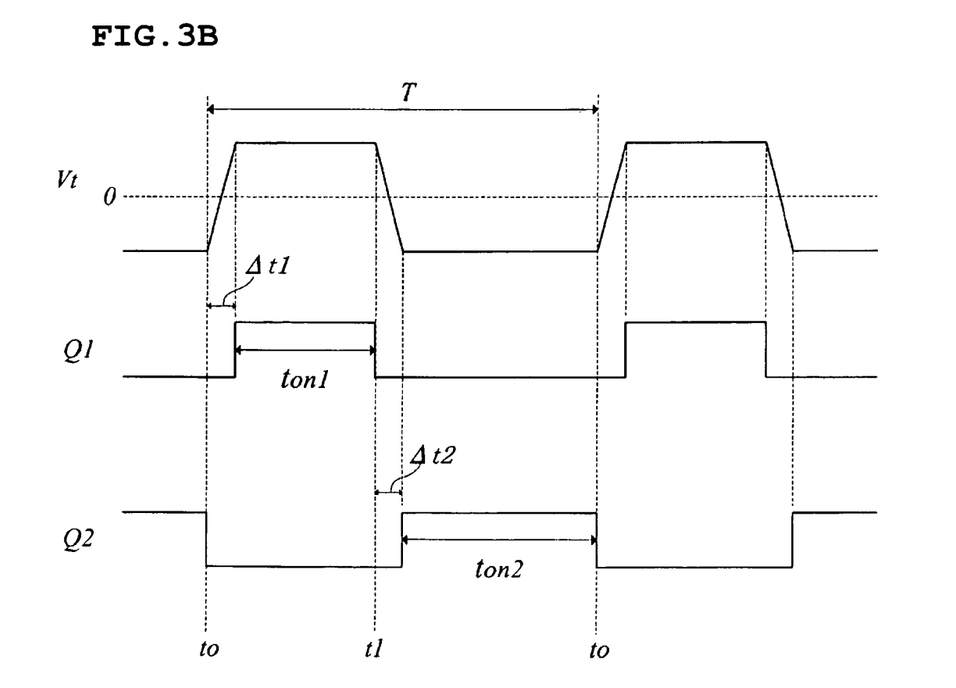

A switching power-supply unit according to a third preferred embodiment will be described with reference to FIG. 3. Part (A) of FIG. 3 is a circuit diagram of the switching power-supply unit, and part (B) is an illustration showing the relationship between the waveform of each section of the switching power-supply unit and time.

Unlike the case shown in FIG. 2, a tertiary winding Lt of the transformer T is provided and a rectification and smoothing circuit constituted by the rectifier diode Ds2 and the smoothing capacitor C2 is connected to the tertiary winding Lt in this example. The second switching control circuit CNT2 detects the output voltage Vo2 of the second output terminal OUT2 and performs feedback control. The other structures are similar as in the second preferred embodiment. This switching power-supply unit operates as a voltage-clamped flyback converter.

Thus, the output voltages Vo1 and Vo2 can be kept at predetermined voltages by controlling the ON-periods ton1 and ton2 of the first and second switching elements Q1 and Q2 by the first and second switching control circuits CNT1 and CNT2, irrespective of the voltage of an input power supply vi and a load current.

A switching power-supply unit according to a fourth preferred embodiment will be described with reference to FIG. 4. Part (A) of FIG. 4 is a circuit diagram of the switching power-supply unit, and part (B) is an illustration showing the relationship between the waveform of each section of the switching power-supply unit and time.

Figure 4A:
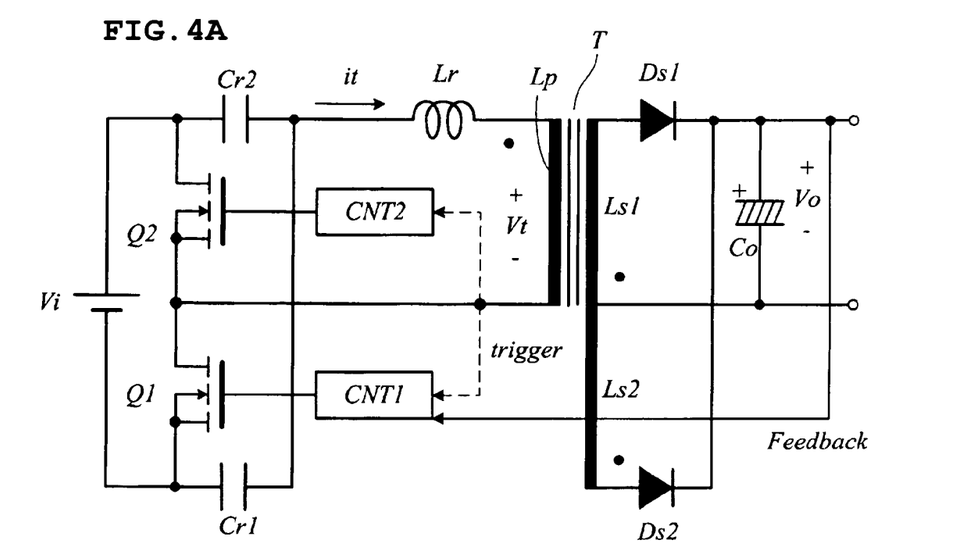
Figure 4B:
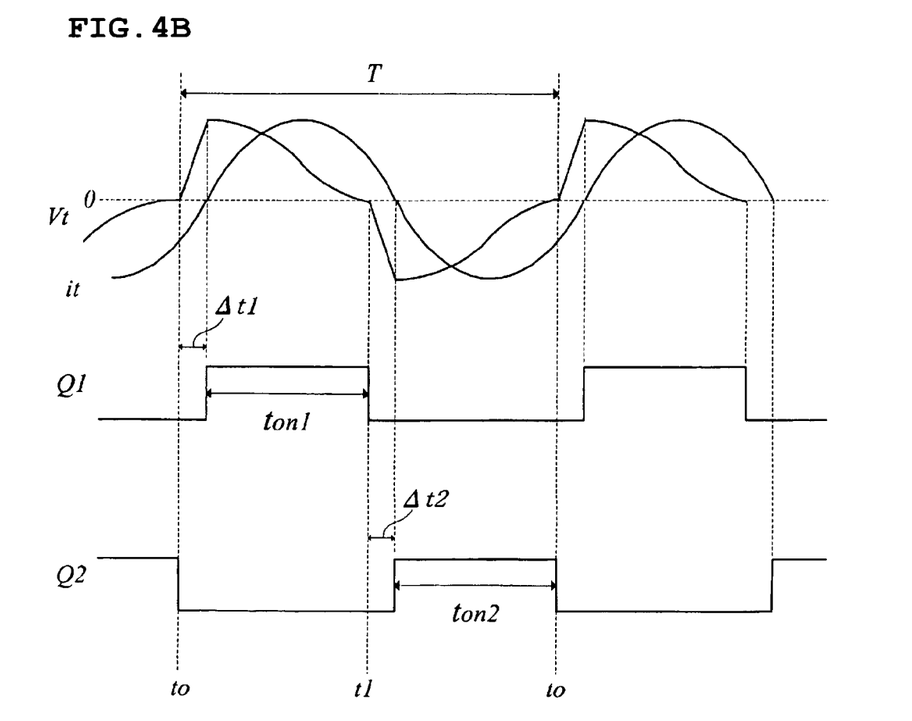

As shown in part (A) of FIG. 4, the first switching element Q1 and a capacitor Cr1 are connected to each other to define a closed loop together with the inductor Lr and the primary winding Lp of the transformer T. The first and second switching elements Q1 and Q2 are connected in series with each other, and the second switching element Q2 and a capacitor Cr2 are connected to each other to form another closed loop together with Lr and Lp. The rectifier diodes Ds1 and Ds2 are connected to secondary windings Ls1 and Ls2 of the transformer T, respectively, and they define a rectification and smoothing circuit together with the smoothing capacitor Co.

The first switching control circuit CNT1 receives a time when the voltage (transformer voltage) of the transformer T rises as a trigger. The first switching control circuit CNT1 also detects the output voltage Vo, and controls the ON-period of the first switching element Q1 such that Vo is set to a predetermined voltage.

The second switching control circuit CNT2 receives a time when the transformer voltage of the transformer T falls as a trigger. The second switching control circuit CNT2 also detects the transformer voltage Vt of the transformer T, and turns off Q2 when Vt becomes zero.

In part (B) of FIG. 4, Vt represents the waveform of the transformer voltage, and it represents the waveform of a current flowing in the primary winding Lp of the transformer T. Also, Q1 and Q2 represent the states of the first and second switching elements Q1 and Q2, respectively. Here, a high-level represents an ON-state, and a low-level represents an OFF-state.

(1) State 1 [t0-t1]

As shown in part (B) of FIG. 4, after the passage of the delay time Δt1 from time t0 when the transformer voltage Vt rises, the first switching control circuit CNT1 turns the gate voltage of Q1 to the high-level, and Q1 is thus turned on.

After turning on Q1, the ON-period ton1 of Q1 is determined such that the output voltage Vo is set to a predetermined voltage. In other words, at a time after the passage of Δt1+ton1 from time t0, the gate voltage of Q1 is turned to the low-level. Thus, Q1 is turned off.

(2) State 2 [t1-t0]

When Q1 is turned off, the transformer voltage Vt falls. After the passage of the delay time Δt2, the second switching control circuit CNT2 turns the gate voltage of Q2 to the high-level using the time when the transformer voltage Vt falls as a trigger. Thus, the second switching element Q2 is turned on.

When the transformer voltage Vt becomes zero, the second switching control circuit CNT2 turns the gate voltage of Q2 to the low-level. Thus, Q2 is turned off.

When Q2 is turned off, since the transformer voltage Vt re-rises, after the passage of the delay time Δt1, the first switching control circuit CNT1 turns the gate voltage of the first switching element Q1 to the high-level using the re-rising of the transformer voltage Vt as a trigger. Time t0 here is equal to the initial time t0.

As described above, by repeating a cycle T shown in part (B) of FIG. 4 as one cycle, operation as a current-resonance half-bridge converter can be achieved.

According to this preferred embodiment, when the transformer voltage Vt becomes zero, since the second switching element Q2 is turned off, the transformer current (the current it flowing in the primary winding Lp of the transformer T) whose phase is delayed with respect to the transformer voltage Vt allows the parasitic capacitances of Q1 and Q2 to be charged and discharged, thus enabling a zero-voltage switching operation of Q1. As a result, the switching loss of Q1 and Q2 can be significantly reduced. Although both the capacitors Cr1 and Cr2 are preferably used in the preferred embodiment of the present invention shown in FIG. 4, similar advantages can be achieved by eliminating one of the capacitors Cr1 and Cr2.

A switching power-supply unit according to a fifth preferred embodiment will be described with reference to FIG. 5. Part (A) of FIG. 5 is a circuit diagram of the switching power-supply unit, and part (B) is an illustration showing the relationship between the waveform of each section of the switching power-supply unit and time.

Unlike the case shown in FIG. 2, the second switching control circuit CNT2 detects a current is flowing in the secondary winding Ls of the transformer T to determine the ON-period ton2 of the second switching element Q2.

Figure 5A:
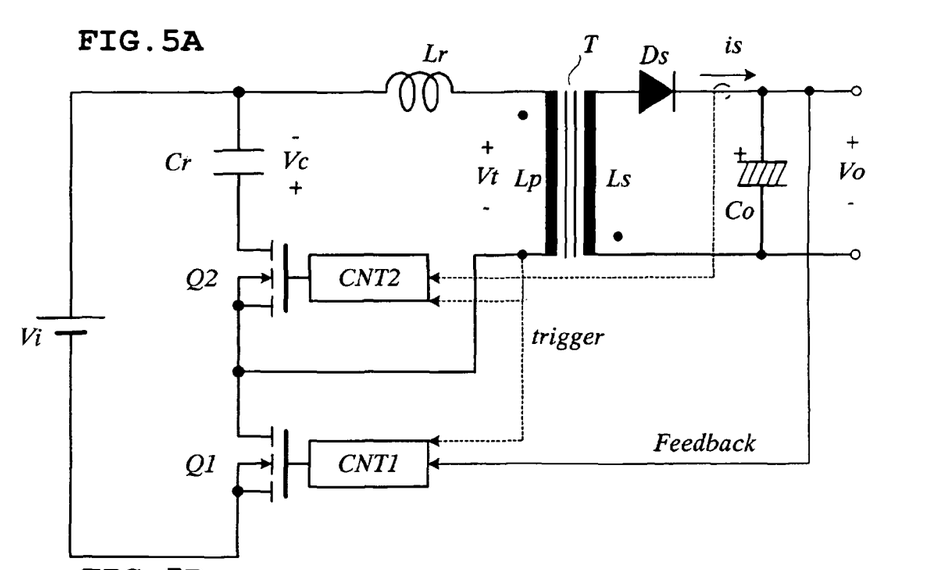
Figure 5B:
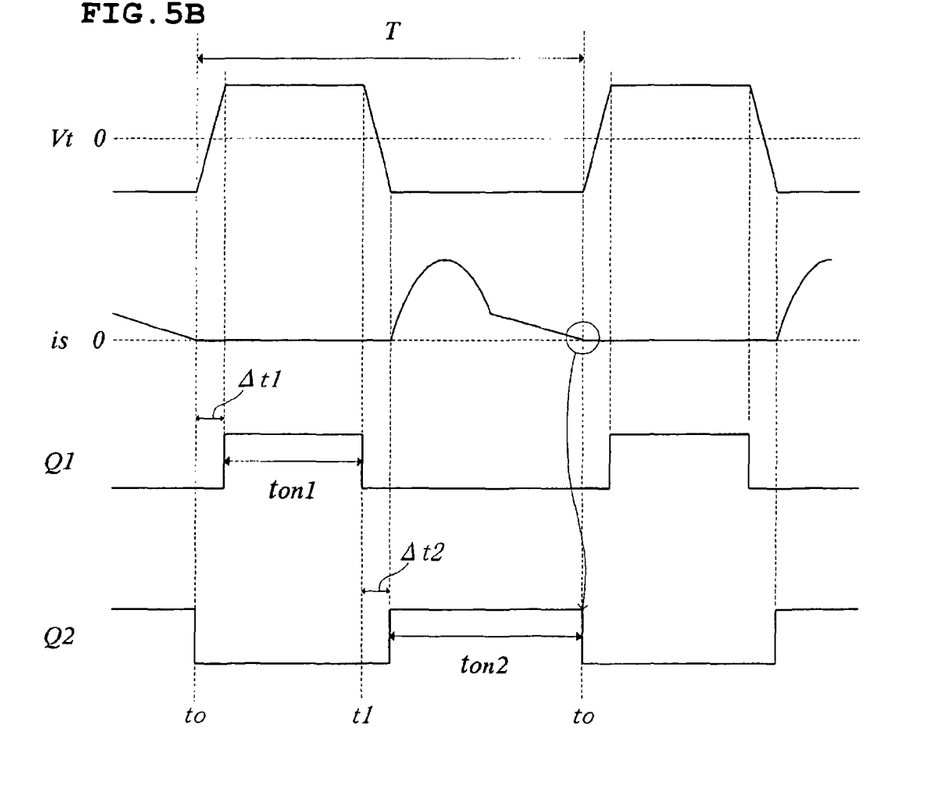

In part (B) of FIG. 5, Vt represents the waveform of the transformer voltage, is represents the waveform of the current flowing in the secondary winding Ls of the transformer T. Q1 and Q2 represent the states of the first and second switching elements Q1 and Q2, respectively. Here, a high-level represents an ON-state, and a low-level represents an OFF-state.

(1) State 1 [t0-t1]

After the current is becomes zero and the delay time Δt1 passes, the first switching control circuit CNT1 turns the gate voltage of the first switching element Q1 to the high-level, and Q1 is thus turned on. The first switching control circuit CNT1 determines the ON-period ton1 of Q1 such that the output voltage Vo is set to a predetermined voltage, and turns off Q1 at time t1.

(2) State 2 [t1-t0]

Thus, the transformer voltage Vt inverts, and the second switching control circuit CNT2 uses the inversion as a trigger. After the passage of Δt2, the second switching control circuit CNT2 turns the gate voltage of the second switching element Q2 to the high-level. Thus, Q2 is turned on. When the current is of the secondary winding Ls becomes zero, the second switching control circuit CNT2 turns the gate voltage of Q2 to the low-level using the current becoming zero as a trigger, and turns off Q2. Thus, the ON-period ton2 of Q2 is determined. This time is equal to the initial time t0 described above.

By repeating the operation described above, operation as a constant-voltage power-supply unit can be achieved.

According to this preferred embodiment, since the second switching element Q2 is turned off when the secondary winding current becomes zero, the conduction period of the rectifier diode Ds and the ON-period of Q2 are equal to each other. As a result, Q2 can be turned off when the current flowing in Q2 becomes zero, and a zero-current switching operation can be performed, thus significantly reducing the switching loss. In addition, an effective current and the peak value of the current is flowing in the switching element Q2, the rectifier diode Ds, and the transformer T are reduced, thus reducing the conduction loss.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

The invention claimed is:

1. A switching power-supply unit comprising:
   an inductor or a transformer;
   a plurality of switching elements arranged to switch a current flowing in the inductor or the transformer and to convert power by turning on and off the plurality of switching elements; and
   a plurality of switching control circuits arranged to turn on a next one of the plurality of switching elements in accordance with a change of a voltage or a current generated due to turning off of one of the plurality of switching elements in an ON-state, to sequentially turn on and off the plurality of switching elements in accordance with each other, to repeat a series of on-off operations of the plurality of switching elements periodically, to determine an ON-period of each of the plurality of switching elements in accordance with a condition individually provided for each of the plurality of switching elements, and to control the ON-period of each of the plurality of switching elements; wherein the plurality of switching elements includes at least first, second, and third switching elements;

the plurality of switching control circuits includes at least first, second, and third switching control circuits;

the first switching control circuit determines an ON-period of the first switching element such that a first output voltage is set to a predetermined value;

the second switching control circuit determines an ON-period of the second switching element such that a second output voltage is set to a predetermined value;

the third switching control circuit determines an ON-period of the third switching element such that a third output voltage is set to a predetermined value; and the predetermined values of the first, second, and third output voltages are different from one another.

2. The switching power-supply unit according to claim 1, wherein a dead time in which two consecutive ones of the plurality of switching elements are turned off is provided between ON-periods of the two switching elements, and wherein the dead time is arranged in accordance with a delay time from turning off of the switching element in the ON-state and turning on of the next switching element.

3. The switching power-supply unit according to claim 2, wherein the dead time is set such that the switching element is turned on when a voltage across the switching element becomes zero or is reduced to near zero.

4. The switching power-supply unit according to claim 1, wherein the switching control circuit turns on the next of the plurality of switching elements using a voltage at the inductor or the transformer generated due to turning off of the one of the plurality of switching element in the ON-state.

5. The switching power-supply unit according to claim 1, wherein the switching control circuit detects an output voltage to a load to determine the ON-period in accordance with the output voltage.

6. The switching power-supply unit according to claim 1, wherein the switching control circuit detects a change or a polarity of a voltage generated at the inductor or the transformer to determine the ON-period.

7. The switching power-supply unit according to claim 1, wherein the switching control circuit detects the current flowing in the inductor or the transformer to determine the ON-period.

8. The switching power-supply unit according to claim 1, wherein the switching control circuit detects a voltage across the switching element to determine the ON-period.

9. The switching power-supply unit according to claim 1, wherein the switching control circuit detects a current flowing in the switching element to determine the ON-period.

10. The switching power-supply unit according to claim 9, wherein the switching control circuit determines the ON-period of the switching element such that the switching element is turned off when the current flowing in the switching element becomes zero or reaches near zero.

* * * * *